United States Patent [19]
Brose et al.

[11] 3,993,798
[45] Nov. 23, 1976

[54] CURED OPAQUE COATING WITH HIGH HIDING POWER PRODUCED FROM NORMALLY TRANSPARENT POLYESTER PASTE FILLER COMPOSITIONS

[75] Inventors: Horst Brose; Karl Dieter Depping, both of Hiltrup; Dietrich Hentschel, Wolbeck; Bernard Kostevc, Munster; Klaus Schmidt, Hiltrup, all of Germany

[73] Assignee: BASF Farben & Fasern Aktiengesellschaft, Hamburg, Germany

[22] Filed: July 14, 1975

[21] Appl. No.: 595,609

Related U.S. Application Data

[63] Continuation of Ser. No. 337,064, March 1, 1973, abandoned.

[30] Foreign Application Priority Data

June 19, 1972 Germany............................ 2229637

[52] U.S. Cl. .......................... 427/44; 204/159.19; 260/861; 260/862; 427/54
[51] Int. Cl.² ......................................... B05D 3/06
[58] Field of Search ........... 427/44, 54; 204/159.15, 204/159.19; 260/861, 862

[56] References Cited

UNITED STATES PATENTS

| | | | |
|---|---|---|---|
| 3,499,781 | 3/1970 | Krueckel............................. | 427/54 |
| 3,669,716 | 6/1972 | Keyl et al............................ | 427/54 |
| 3,699,022 | 10/1972 | Behrens et al....................... | 427/54 |
| 3,721,723 | 3/1973 | Heidel................................. | 427/54 |
| 3,760,033 | 9/1973 | Arbuckle............................. | 427/54 |

*Primary Examiner*—John H. Newsome
*Attorney, Agent, or Firm*—Gilbert L. Wells

[57] ABSTRACT

Cured, opaque coatings with high hiding power are produced on a substrate from a normally transparent and radiation transmitting unsaturated polyester paste filler composition containing customary additives, curing catalysts and optionally fillers of low hiding power and non-reactive solvents and/or plasticizers wherein the filler composition has a weight ratio of unsaturated polyester to the sum of copolymerizable monomers and optionally non-reactive solvents and plasticizers of from about 10 : 12 to 10 : 40, preferably from about 10 to 15. The unsaturated polyester filler composition may further have up to 95 percent by weight of the copolymerizable monomers replaced by the non-reactive solvents and/or plasticizers. The composition may be cured by UV rays, sunlight or other ionizing radiation.

6 Claims, No Drawings

CURED OPAQUE COATING WITH HIGH HIDING POWER PRODUCED FROM NORMALLY TRANSPARENT POLYESTER PASTE FILLER COMPOSITIONS

This is a continuation of application Ser. No. 337,064, filed Mar. 1, 1973, now abandoned.

CROSS REFERENCES TO RELATED APPLICATIONS

Applicants claim priority under 35 U.S.C. 119 for Application P 22 29 637.3, filed June 19, 1972 in the Patent Office of the Federal Republic of Germany.

The present application is a Continuation of Application Ser. No. 337,064, filed March 1, 1973, and now abandoned.

The disclosure of assignee's copending application Ser. No. 337,063, filed Mar. 1, 1973 and having the title "Opaque Molded Polyester Copolymer Articles and Coatings" and now U.S. Pat. No. 3,933,875 is incorporated herein.

Assignee's copending application Ser. No. 100,401, filed Dec. 21, 1970 and now abandoned is also incorporated herein to show the state of the art of radiation curing of unsaturated polyester films. The disclosures of U.S. Pat. Nos. 3,008,242; 3,013,895; 3,060,023, 2,9;4,404; 3,147,119; 3,346,383; and 3,677,763 cited in the prosecution of application Ser. No. 100,401 are also incorporated herein to show the state of the art of radiation curing of unsaturated polyester films.

BACKGROUND OF THE INVENTION

The present invention relates to a process for manufacturing cured opaque coatings with a high hiding power based on paste filler compositions of radiation curable unsaturated polyesters and copolymerizable monomers. The invention further relates to these paste filler compositions for producing the cured, opaque coatings with high hiding power. Such coatings serve as dense and continuous, opaque layers with excellent hiding power on various substrates. They also serve as filling material for cavities to make subsequent lacquering possible.

It is known to use highly filled, pigmented polyester paste filler compositions as coating agents for different substrates. They are applied, for example, to substrates of wood, materials based on wood, plastics, metals and the like. These known polyester paste filler compositions contain unsaturated polyesters and copolymerizable monomers as film-forming binders. Curing is effected by copolymerization of the components using suitable curing agent systems, such as peroxide curing agents and metal or amine accelerators. These materials are two-component materials which are difficult to handle. The time required for curing and for manufacturing of cured layers is considerable. The hiding pigments present in these prior art polyester paste filler compositions prevent a transparency necessary for the penetration of rays and as a result curing by means of UV radiation or sunlight is not possible.

Transparent and clear unsaturated polyester compositions can be cured with UV rays if a special UV sensitizer is present. As a result clear coatings are obtained and can be used as clear lacquers in the lacquering of wood, the wood grain remaining visible.

According to German Published Application DAS No. 1,621,820, radiation curing by the use of UV rays can still be performed if the transparent polyester paste filler compositions contain filler material of very low hiding power. The resulting coatings do not have sufficient hiding power. Curing of unsaturated polyesters and copolymerizable monomers with UV rays permits an economical and simple manufacturing of lacquered materials, due to the very short curing times. For the reason, however, that only transparent and clear coatings could hitherto be cured, the application of UV curing has been very limited.

The present invention relates to a process for manufacturing cured opaque covering layers with high hiding power from polyester paste filler compositions by radiation curing. This process increases the range of application of radiation curing.

The term "polyester filler compositions" in the subsequent text, includes all preparations based on liquid paste filler or coating compositions, used as coating agents for the manufacture of coating layers on wood, wood materials, plastics, hardboard, molded plastic materials, metals, brickwork, concrete, cement, quite generally on any desired substrate. The term also includes the compositions disclosed in assignee's copending application Ser. No. 337,063, now U.S. Pat. No. 3,933,875 entitled "Opaque Molded Polyester Copolymer Articles and Coatings".

In these cases the coating covers the substrate completely or partially. It can be employed for filling cavities, for priming and for the production of smooth coatings for subsequent lacquering. In addition, the polyester paste filler compositions can be applied onto the existing lacquer coatings.

The polyester paste filler compositions consist of radiation curable unsaturated polyesters and copolymerizable monomers. Unsaturated polyesters are described in detail and summarized, in the standard literature "Polyesters and Their Applications" (Bjorksten, Tovey, Harker and Henning. N.Y. Reinhold Publishing Corporation, 1956), "Polyester Resins" (Lawrence, N.Y. Reinhold Publishing Corporation 1960), and "Unsaturated Polyesters: Structure and Properties" (Boenig, Amsterdam, Elsevier Publishing Company, 1964).

The term "radiation-curable" in the subsequent text, includes those polyester paste filler compositions which can be cured by the use of irradiating UV rays, sunlight or more efficient ionizing rays. The term "radiation curing" includes all curing of coatings based on radiation curable polyester paste filler compositions by the use of UV rays, sunlight or more efficient ionizing rays. The known processes for radiation curing are summarized, for example, in the publications "Die Lichthartüng von Polyester-Lacken" ("Curing Polyester Lacquers by means of Light") (Eugen Richter, "Moderne Holzverarbeitung", issue 10, 1968, pages 604–606) and "Lackhartüng durch ultraviolettes Licht" ("Lacquer Curing by Ultraviolet Light") (Dr. Wolfgang Deninger and Dr. Manfred Patheiger, Industrie-Lackier-Betrieb, 37th year, issue 3, March 1969, pages 85–91).

SUMMARY OF THE INVENTION

As a result of thorough research, the problem of producing cured opaque coatings having high hiding power based upon radiation-curable unsaturated polyester paste filler compositions and copolymerizable monomers has been solved. It has surprisingly been found, that a transparent and radiation transmitting unsaturated polyester paste filler composition containing customary additives, curing catalysts and, optionally, fillers of low hiding power and further, optionally, non-reactive solvents and/or, optionally, plasticizers, when applied to a substrate, said filler composition having a weight ratio of unsaturated polyester to the sum of copolymerizable monomers and, optionally, non-reactive solvents and/or, optionally, plasticizers from 10 : 12 to 10 : 40, preferably from 10 to 15, said unsaturated polyester paste filler composition having further up to 95 percent by weight of the copolymerizable monomers replaced by the optionally present non-reactive solvents and/or plasticizers, is subsequently cured to an opaque coating by means of UV rays, sunlight or more effective ionizing radiation.

The process can further be extended by the polyester paste filler composition additionally containing coloring substances as for example dyestuffs or pigments of low hiding power. Furthermore, it is advantageous that the polyester paste filler composition contains additionally other compatible synthetic resins which are different from the unsaturated polyesters.

A further embodiment of the invention is a paste filler composition based on radiation-curable unsaturated polyesters and copolymerizable monomers for performing the process for the manufacturing of cured, opaque coatings with high hiding power comprising a transparent and radiation transmitting polyester paste filler composition, which contains customary additives, curing catalysts and, optionally, fillers of low hiding power and also, optionally, non-reactive solvents and/or, optionally, plasticizers, consisting of unsaturated polyesters in the weight ratio of unsaturated polyester to the sum of copolymerizable monomers and, optionally, non-reactive solvents and/or, optionally, plasticizers, of about 10 : 12 to 10 : 40, preferably 10 to 15, and that furthermore up to 95 percent by weight of the copolymerizable monomers are replaced by non-reactive solvents optionally present in the polyester paste filler composition and/or the optionally present plasticizers.

DESCRIPTION OF THE PREFERRED EMBODIMENTS

It was surprising and not foreseeable that using the process according to the invention, that radiation curing of transparent, radiation transmitting polyester paste filler compositions yields completely opaque coatings, which are no longer transparent or clear, but have a white appearance and high hiding power.

Furthermore, it was surprising that the whitening degree of the cured coating according to the invention was remarkably higher than the whitening degree obtained from polyester paste filler compositions containing titanium dioxide as a white pigment. The white coatings represent outstanding technological properties which up to now could only be obtained from highly pigmented polyester paste filler compositions using other conventional curing processes. The advance over the art of the process according to the invention is considerable. The field of radiation curing of polyester paste filler compositions can substantially be extended with the result that expensive pigments are saved, such as, for example, titanium dioxide, since curing of unpigmented compositions or transparent lacquers results in opaque white coatings, if a very particular ratio between unsaturated polyesters and copolymerizable monomers, inactive solvents and plasticizers is observed. The surprising effect that a transparent polyester paste filler composition becomes opaque during radiation curing was not predictable justifies the invention.

The production of opaque coatings having high hiding power by radiation curing of polyester paste filler compositions applied to a substrate results from a special ratio chosen between unsaturated polyesters, copolymerizable monomers, non-reactive solvents and plasticizers, in such a way that the ratio by weight of polyesters to the sum of copolymerizable monomers, non-reactive solvents and/or plasticizers is from about 10 : 12 to 10 : 40. In the simplest case only unsaturated polyesters and copolymerizable monomers are present and the ratio of the polyester to the copolymerizable monomers is from about 10 : 12 to 10 : 40. The quality of the hiding power effect depends on the choice of the monomers and of the non-reactive solvents. The highest degree of whitening is achieved at a preferred ratio of unsaturated polyester to the sum of copolymerizable monomers, non-reactive solvents and/or plasticizers of about 10 to 15. The presence of only copolymerizable monomers and the absence of non-reactive solvents and/or plasticizers meet the requirements. If the proportion of unsaturated polyester lies outside these indicated ratio limits, the polyester paste filler compositions produce transparent coatings instead of coatings with high hiding power.

The surprising effect, that the cured polyester paste filler gives opaque coatings normally occurs when the defined ratios of unsaturated polyester and copolymerizable monomers are observed. It also occurs, when the copolymerizable monomers are partially replaced by non-reactive solvents and/or plasticizers. It was found that up to 95 percent of the copolymerizable monomers can be replaced by suitable non-reactive solvents and/or plasticizers. This change in the proportions of monomers does, however, not change the ratio of the sum of monomers, non-reactive solvents and plasticizers.

Suitable non-reactive solvents are, for example, aliphatic and aromatic hydrocarbons such as benzene, toluene and xylene, gasoline, aliphatic alcohols, glycols, ethers and esters of aliphatic carboxylic acids with monohydric aliphatic alcohols. As plasticizers all customary plasticizers compatible with polyesters, can be used, such as for example, esters of monocarboxylic or polycarboxylic acids, esters of adipic acid or of phthalic acid with aliphatic alcohols, also esters of phosphoric acid and furthermore epoxide plasticizers.

The manufacture of the opaque coatings having high hiding power by means of radiation curing of polyester paste filler compositions does not depend on particular types of unsaturated polyesters. As known in the prior art, polyester paste filler compositions consist of solutions of unsaturated polyesters in copolymerizable monomers. Unsaturated polyesters are ester-like condensation products based on polyhydric alcohols, especially dihydric alcohols, and ethylenically unsaturated dicarboxylic acids. Modification by substitutes of monohydric alcohols and substitutes of monocarboxylic or dicarboxylic acids is possible. All commercially available types of polyester resin can be used.

Unsaturated polyesters are described comprehensively in the literature mentioned above.

Suitable copolymerizable monomers are the customary ethylenically unsaturated substances used individually or as mixtures, such as, for example, styrene, vinyltoluene, methyl methacrylate, ethyl acrylate, ethyl methacrylate, allyl compounds and divinylbenzene.

Generally, all copolymerizable monomers described in the literature mentioned above are suitable.

Curing of the layers of polyester paste filler compositions applied to the substrate is effected by the influence of rays of UV light, sunlight or more efficient ionizing radiation. In principle, the radiation curable polyester paste filler compositions need so-called photosensitizers. The photochemically initiated process by splitting of radicals results in cured paste filler coating layers, when radiation is used. Quite generally, all substances which can usually be employed as photosensitizers can be used for the curing reaction. However, these photosensitizers are not the subject of this patent application and are not claimed here.

As customary energy sources for UV radiation mercury vapor high pressure lamps, mercury vapor low pressure lamps or superactinic fluorescent tubes can be used. The time required for complete curing of the polyester paste filler coatings is very short and depends upon the reactivity of the unsaturated polyesters, the monomers, the composition of the polyester paste filler material, the photosensitizer and the quality and the amount of the irradiating rays. Furthermore, it is possible to additionally accelerate the radiation curing by using infrared radiators, high frequency energy or elevated temperatures.

It is possible to vary the technological properties of the opaque layers obtained by radiation curing polyester paste filler compositions. In general, hardness, appearance, surface, character and degree of gloss can be varied by the polyester type, by type of monomers, type of non-active solvents and/or plasticizers and/or fillers used. The radiation curable polyester paste filler compositions can furthermore contain customary auxiliaries and additives, such as anti-foaming agents, flow control agents, paraffin, wax, silicone oils and the like. Exactly as in the case of layers obtained from highly pigmented paste filler compositions containing pigments with high hiding power finishing of the opaque layers obtained according to the invention may be affected by mechanical processes such as buffing, grinding and polishing. A further development of the process and the polyester paste filler composition according to the invention, resulting in particularly advantageous, opaque coatings with improved properties relates to polyester paste filler compositions containing other synthetic resins or polymers which are different from the unsaturated polyesters and compatible with them. As examples are mentioned nitrocellulose, cellulose acetobutyrates, alkyd resins, ketone resins, saturated polyesters, epoxide resins, polyurethanes, amine-aldehyde resins, urea-formaldehyde resins, melamine-formaldehyde resins, phenolic resins, acrylate and/or methacrylate resins, homopolymers and copolymers of vinyl chloride, vinyl acetate, vinyl propionate and other vinyl compounds, and polyolefines. Said other synthetic resins can be used additionally in quantities up to 15 percent, preferably 0.1 to 5 percent by weight, based on the weight of unsaturated polyesters.

Suitable fillers of low hiding power are finely powdered substances, the refractive index of which does not differ significantly from the refractive index of the solution of unsaturated polyesters in copolymerizable monomers such as, for example, silicone dioxide, calcium carbonate, barium sulphate, talc, mica, dolomite, kaolin, quartz powder, rock powder, glass powder and fibrous micro-substrates of asbestos, plastics, glass or textile products. Generally, fillers of which the refractive index does not exceed 1.70 can be used.

Examples of suitble transparent coloring dyes are:
 a. metal complex dyes e.g. helio fast yellow 12 G (Bayer AG, Leverkusen), pigment green G (BASF AG, Ludwigshafen), helio fast carmin B (Bayer AG, Leverkusen),
 b. diazo dyes, e.g. chrom fast yellow 2 b (Ciba, Basel), chrom fast red 2 R (Ciba),
 c. Dioxazin dyes, e.g. PV fast violett BL (Höchst),
 d. indanthren dyes, e.g. indanthren violett RH (BASF), PV fast orange GRL (Höchst).

Generally all transparent synthetic dyes alone or in combination can be used. The quantity depends on the desired color tone and lies between 0.001 and 1 percent by weight, preferably between 0.02 and 0.3 percent, relating to the total weight of unsaturated polyester and copolymerizable monomers.

The radiation curable polyester paste filler composition is applied by means of conventional techniques in the usual way, onto the particular substrate. For example, a roller applicator machine or a coating knife may be used. The substrates to be coated can be materials consisting of wood, wood-materials, molded plastic materials, plastics, paper, leather, cardboard, metal, asbestos, glass or textiles.

The amount of radiation curable polyester paste filler composition applied per unit of the base surface to be coated varies according to the substrate and the proposed use. For the manufacture of uniform layers, a layer thickness of between 50 and 400 microns is preferred. However, thinner or thicker layers can be manufactured. In the case of very thin layers of (less than 50 microns) the hiding power of the opaque coating can be reduced.

The following examples serves to explain the invention without limiting it. The parts mentioned are parts by weight and the percentage data relate to percentages by weight.

EXAMPLE 1

A. An unsaturated polyester resin is manufactured by conventional methods from:
 26 parts of 1,2-propylene glycol,
 16 parts of maleic anhydride and
 20 parts of phthalic anhydride.
 0.003 parts of hydroquinone are added to the bath as a stabilizer and the resin is diluted with styrene, at temperatures of between 90° and 95° C. to a solids content of 65 percent. The resulting polyester resin has an acid number of 35.

B. A paste filler composition is manufactured from the following components:
 21.5 parts of the polyester solution obtained according to 1 A,
 1.0 part of benzoin-isopropyl-ether,
 3.0 parts of cellulose acetobutyrate solution (25 percent solid contents in a mixture of alcohol and styrene 1 : 2),
 41.0 parts of blanc fixe,
 7.9 parts of micro-talc, average particle size 5 - 10 microns,
 0.7 parts of zinc stearate,
 11.3 parts of a precipitated calcium carbonate,
 4.8 parts of vinyltoluene, and
 4.8 parts of ethylglycol.

Approximately 130 g/m$^2$ of this paste filler composition are applied to a chipboard sheet using a paste filler applicator. The chipboard sheet coated with the polyester layer is passed through a drying tunnel in which mercury vapor high pressure lamps (Philips HTQ 7) are arranged successively at intervals of 25 cm. The distance of the layer to be cured from the mercury vapor high pressure lamps is 25 to 30 cm. and the curing time is 40 seconds. A pure white coating results which is opaque and susceptible to grinding, and can serve as a paste filler coating for subsequent lacquering build-up.

EXAMPLE 2

The unsaturated polyester resin manufactured according to Example 1 A is diluted with ethylglycol instead of styrene and 21.5 parts of this solution are used for a polyester composition. The polyester composition additionally contains 1.0 part of benzoin-isopropyl-ether,
3.0 parts of a 25 percent strength solution of cellulose acetobutyrate (Cellit BP 900, Bayer AG, Leverkusen, in a mixture of alcohol and styrene, 1 : 2),
41.0 parts of blanc fixe,
7.9 parts of micro talc of average particle size between 5 and 10 microns,
0.7 parts of zinc stearate,
11.3 parts of precipitated calcium carbonate, and
9.6 parts of ethylglycol.

Approximately 120 g/m$^2$ of this polyester composition are applied to a chipboard sheet using a paste filler applicator. The coating is cured as described in Example 1. A white paste filler coating results, which can be ground and on which further lacquer coatings can be applied.

EXAMPLE 3

Example 2 is repeated with the only difference that the polyester paste filler composition contains 9.6 parts of vinyltoluene instead of the 9.6 parts of ethylglycol. Again the result is a white, opaque coating with high hiding power.

EXAMPLE 4

A polyester paste filler composition is manufactured from the following components:

21.5 parts of the polyester solution obtained according to Example 1 A,
1.0 part of benzoin isopropyl ether,
3.0 parts of a copolymer of polyvinyl chloride and polyvinyl acetate (Vinylite VERR, Messrs. Union Carbide) as a 40 percent strength solution in styrene,
41.0 parts of blanc fixe
7.9 parts of micro talc of average particle size between 5 and 10 microns,
0.7 part of zinc stearate,
11.3 parts of finely powdered Jura chalk,
4.8 parts of vinyltoluene,
4.8 parts of ethylglycol, and
0.35 part of Helio fast yellow G dyestuff. (Bayer AG, Leverkusen)

Approximately 130 g/m$^2$ of this paste filler composition are applied to a chipboard using a paste filler applicator. Curing takes place as indicated in Example 1. An opaque coating with high hiding power and uniform yellow appearance results.

We claim:

1. In the process for manufacturing cured coatings from radiation curable polyester compositions containing unsaturated polyesters, copolymerizable monomers, sensitizers, accelerators, normal additives and filler materials of low hiding power, comprising applying said polyester composition to a substrate and curing by ionizing rays, the improvement comprising said polyester composition consisting essentially of:
   I. filler materials having refractive indices not exceeding 1.70 in a weight ratio of about 150 percent related to the sum of weights of
      a. polyesters; and
      b. copolymerizable monomers being present in a weight ratio a : b between 10 : 12 to 10 : 40;
   II. 0.1 to 15 percent by weight synthetic resins of the classes nitrocellulose, cellulose-acetobutylate, alkyd resins, ketone resins, saturated polyester resins, epoxide resins, polyurethane resins, amine aldehyde resins, phenolic resins, acrylate resins, methacrylate resins, homopolymers of vinyl chloride, copolymers of vinyl chloride, vinyl acetate, vinyl propionate, vinyl compounds and polyolefin resins; and
providing opaque coating with said curing with ionizing rays.

2. In the process for manufacturing cured coatings from radiation curable polyester compositions containing unsaturated polyesters, copolymerizable monomers, sensitizers, accelerators, normal additives, non-reactive solvents and plasticizers and filler materials of low hiding power, comprising applying said polyester composition to a substrate and curing by ionizing rays, the improvement comprising said polyester composition consisting essentially of:
   I. filler materials having refractive indices not exceeding 1.70 in a weight ratio of about 150 percent related to the sum of weights of
      a. polyesters; and
      b. copolymerizable monomers, non-reactive solvents and plasticizers being present in a weight ratio a : b between 10 : 12 to 10 : 40;
   II. 0.1 to 15 percent by weight synthetic resins of the classes nitrocellulose, cellulose acetobutyrate, alkyd resins, ketone resins, saturated polyester resins, epoxide resins, polyurethane resins, amine aldehyde resins, phenolic resins, acrylate resins, methacrylate resins, homopolymers of vinyl chloride, copolymers of vinyl chloride, vinyl acetate, vinyl propionate, vinyl compounds and polyolefine resins; and providing opaque coatings with said curing with ionizing rays.

3. The process of claim 1, wherein 0.1 to 5 percent synthetic resins are present.

4. The process of claim 3, wherein additionally about 0.001 to 1 percent per weight transparent coloring dyes selected from the group consisting of metal complex dyes, diazo dyes, dioxazine dyes and indanthrene dyes are present.

5. The process of claim 2, wherein 0.1 to 5 percent synthetic resins are present.

6. The process of claim 5, wherein additionally about 0.001 to 1 percent per weight transparent coloring dyes selected from the group consisting of metal complex dyes, diazo dyes, dioxazine dyes and indanthrene dyes are present.

* * * * *